United States Patent [19]

Smith

[11] 4,390,271

[45] Jun. 28, 1983

[54] PROCESS FOR PRODUCING ORTHOGRAPHIC PROJECTION IMAGE OF COMPLEX TERRAIN/TARGETS FROM AN AUTOMATIC SYSTEM USING TWO PHOTOGRAPHS

[75] Inventor: James L. Smith, Grand Prairie, Tex.

[73] Assignee: The United States of America as represented by the Secretary of the Army, Washington, D.C.

[21] Appl. No.: 330,117

[22] Filed: Dec. 14, 1981

[51] Int. Cl.³ .................................... G03B 27/32
[52] U.S. Cl. .................................... 355/77; 355/22; 355/52; 355/79
[58] Field of Search ................... 355/22, 52, 79, 77; 356/71

[56] References Cited

U.S. PATENT DOCUMENTS

| | | | |
|---|---|---|---|
| 3,501,238 | 3/1970 | Stetson et al. | 355/79 X |
| 3,738,746 | 6/1973 | Lewis et al. | 355/22 |
| 3,915,569 | 10/1975 | Pölzleitner | 355/22 X |

Primary Examiner—Richard A. Wintercorn
Attorney, Agent, or Firm—Robert P. Gibson; Anthony T. Lane; James T. Deaton

[57] ABSTRACT

An optical-recording process is used to produce an edge-enhanced, darkfield, orthographic projection image of complex terrain or target configuration by utilizing two photographs from cameras pointed in the same direction, but at different arbitrary coordinates, to produce edge-enhanced darkfield transparency inputs for the process.

4 Claims, 4 Drawing Figures

PROCESS FOR PRODUCING ORTHOGRAPHIC PROJECTION IMAGE OF COMPLEX TERRAIN/TARGETS FROM AN AUTOMATIC SYSTEM USING TWO PHOTOGRAPHS

DEDICATORY CLAUSE

The invention described herein may be manufactured, used, and licensed by or for the Government for governmental purposes without the payment to me of any royalties thereon.

BACKGROUND OF THE INVENTION

There is always a need for photographing or mapping manmade or geographic features for use in determining distances or simply for recognition. Wide angle photographs taken of complex features, however, record features differently, depending on the position and angle of the camera. The relative positions of important features recorded by the camera film depend on perspective and the distance of those features from a plane perpendicular to the camera line-of-sight, as well as their distance measured along that plane. To avoid this problem, high-altitude photography, for example, may require very many narrow angle photographs taken of terrain directly beneath the camera. Mapping may utilize sterographic recording where two cameras are separated so as to afford the mapper the parallax he needs to determine the position of a feature which would occur on an orthographic projection. Both these techniques are tedious and time-consuming.

Therefore, it is an object of this invention to provide a system or process which utilizes only two photographs as an input and does not require a person to be involved in point-by-point transformation to an orthographic projection image.

Another object of this invention is to provide an orthographic projection which is not only of interest in mapping, but also is relevant to incoherent light image recognition for missile guidance.

Still another object of this invention is to provide a process or system for which, despite the change in size and perspective of images on the image plane, an on-course missile will always have a portion of the terrain/target image coincident with that of the orthographic projection on some suitable plane.

Other objects and advantages of this invention will be obvious to those skilled in this art.

SUMMARY OF THE INVENTION

In accordance with this invention, an optical-recording system or process is provided which includes making a pair of photographs that are transformed to edge-enhanced darkfield transparencies and the darkfield transparencies are used to expose frames that are developed to produce positive transparencies. The positive transparencies are superimposed and a collimated light source is passed through the positive transparency frames and focused by a cylindrical lens to a line on a final recording plate. The image produced on the final recording plane by the collection of such lines is an edge-enhanced, orthographic projection of the terrain/target configuration onto a plane normal to the lines along which the cameras were pointed to make the photographs of the terrain/target.

DESCRIPTION OF THE PREFERRED EMBODIMENT

Figure 1:
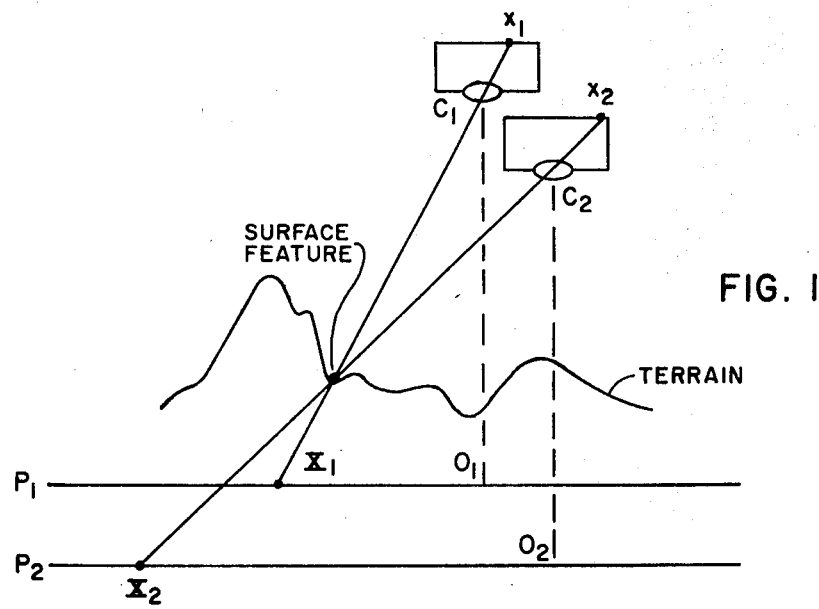
FIG. 1 is a schematic illustration showing an arrangement for recording imagery pertinent to orthographic projection image of complex terrain/target configuration.

Referring now to FIG. 1 which depicts the photographic process, planes $P_1$ and $P_2$ are both a distance kf from $C_1$ and $C_2$, respectively (f=camera lens focal lenght and k=constant). By any suitable means (spatial filtering, etc.) the photographs are transformed to edge-enhanced darkfield transparencies. This means that all regions where the terrain/targets change from one intensity to another, a bright (transparent) line occurs on the transparency and all regions around this edge are dark (opaque). The area of the transparency which transmits light must be a small percentage of the total.

Figure 2:
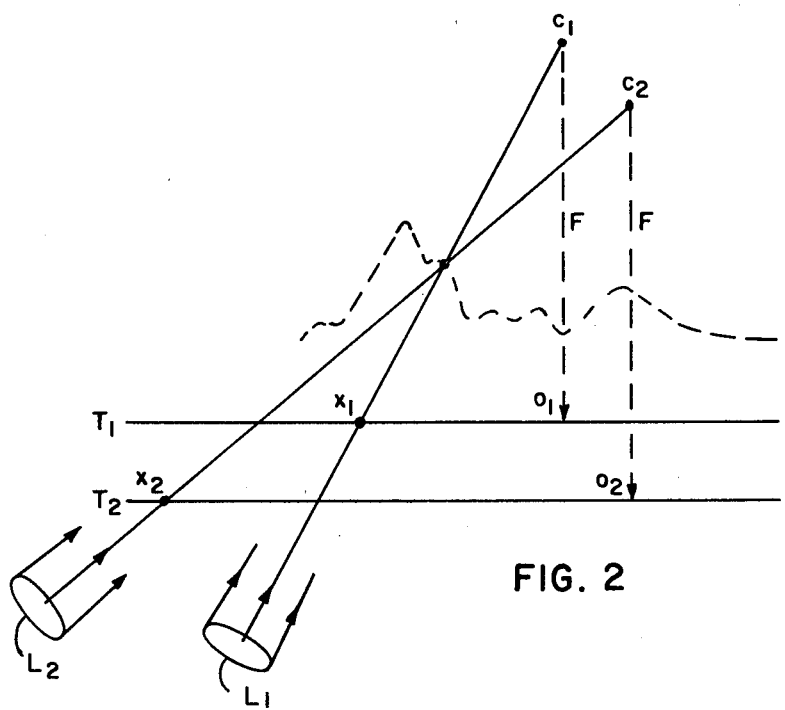
FIG. 2 is a schematic illustration illustrating the relationship of recorded imagery to terrain/target configuration.

Refer now to FIG. 2 which shows the position of each transparency ($T_1$ or $T_2$) and lens ($L_1$ or $L_2$) which focuses light to the point $c_1$ or $c_2$ for reconstruction. The transparency positions and convergent illuminating lens are arranged such that $\overline{c_1 o_1}, \overline{c_2 o_2} = F$; $x_1$, $x_2 = k'X_1$, $k'X_2$ and $\overline{o_1 o_2} = \overline{k'O_1 k'O_2}$ (If the transparencies are the same size as the camera image, then $F=f$ and $k'=1/k$). Hence the intersection of rays coming from different lens positions and focusing at $c_1$ and $c_2$ occur on a reduced-scale representation of a terrain/target surface element.

Figure 3:
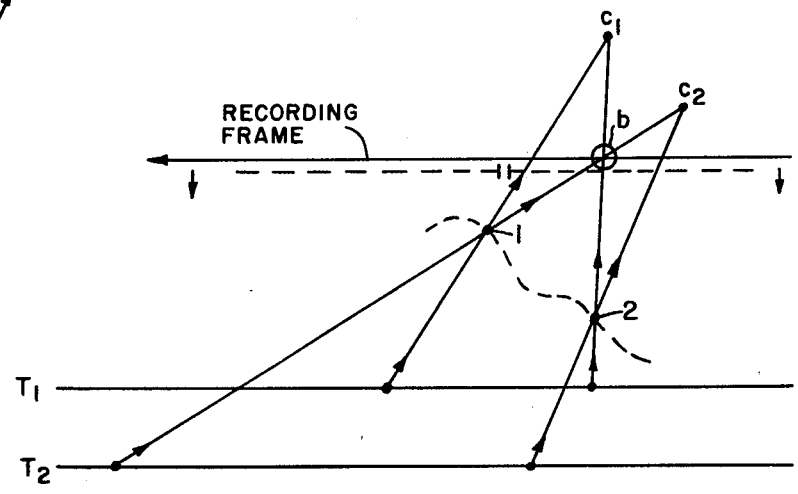
FIG. 3 is a schematic illustration illustrating exposure of the first recording frame leading to orthographic representation of terrain/target features and errors due to non-simultaneous exposure and false imagery.

FIG. 3 schematically depicts the process of exposing a recording frame as illustrated (usually a photographic plate) to light rays in the configuration shown in FIG. 2. If it were possible to have light rays simultaneously coming through $T_1$ and $T_2$, converging at $c_1$ and $c_2$ which registered on the recording frame only at the intersections of those rays, then lowering the recording frame during exposure toward $T_1$ would record an orthographic projection of the desired features. However, the film integrates the exposure, intersecting or not; hence an excessively exposed, blurred image results. This problem is eliminated by special treating of $L_1$, $T_1$, $c_1$, and $L_2$, $T_2$, $c_2$ independently. A slit aperture plate (see perforated lines in FIG. 3) is placed in contact under the frame which is slid forward as the slit in the aperture plate is lowered toward $T_1$ (or $T_2$). Information from a very narrow strip of $T_1$ (or $T_2$) is now recorded over the entire frame, the position on the frame determined by slit height above $T_1$ (or $T_2$). When the developed frame (also edge-enhanced darkfield) is placed over that for the other lens-transparency configuration, the clear transmitting portions of the pair define the height and position at which rays from the two different lens-transparency configurations intersect. By forming pairs of such exposed frames for all slit positions and "squeezing" them all together such that each frame is a strip, an orthographic projection image is produced. However, there will be some regions where the rays intersect incidentally where a surface feature does not exist. Such bogus (false) features may be greatly reduced in numbers if the line containing $c_1$ and $c_2$ is parallel to the direction of least feature density. Limited verical travel on the recording frame to eliminate higher lying bogus points will also help. FIG. 3 shows intersections due to real surface imagery (points 1 and 2) and a bogus (b). Recall that the edge-enhanced darkfield transparencies transmit over areas small compared to that of the opaque areas. This is necessary to obtain a high resolution orthographic projection image. The described process involves operations which show sharper coincidence peaks when the transmitting regions are very small.

Figure 4:
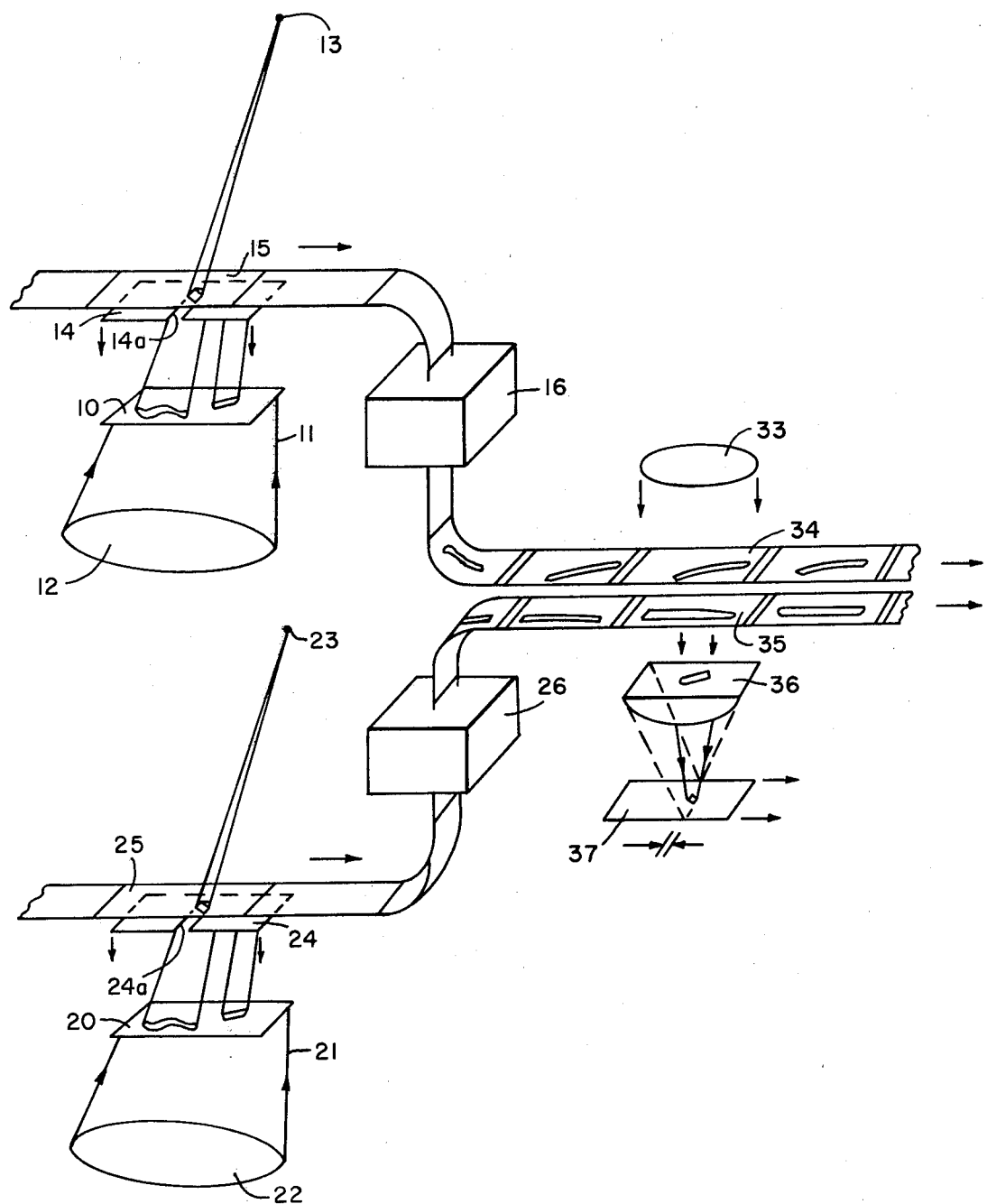
FIG. 4 is a schematic illustration illustrating the system for obtaining edge-enhanced darkfield image record of the orthographic projection of complex terrain/target features.

Refer now to Fig. 4 for the overall system processing. An edge-enhanced darkfield transparency 10 is made from a photograph of the terrain/target configuration. The coordinates of the camera which made the photograph are known. A lens 12 focuses a beam of the well-collimated light 11 to the point 13 which relates to the camera coordinates. The focused beam passes through a slit aperture 14a of aperture plate 14 and exposes a photographic recording frame 15. Slit plate 14, and recording frame 15 remain in contact while the slit plate 14 moves downward and the recording frame 15 moves horizontally with respect to it. Frame 15 is next developed at location 16 in a conventional manner to give a positive transparency and joins another frame which is identically processed through elements 20-26 from an edge-enhanced, darkfield transparency 20 relating to a photograph of the target/terrain configuration made by a camera at a second set of coordinates as described in relation to FIGS. 1 and 2 above. Collimated light from the source 33 passes through the two superimposed frames 34 and 35 and is focused by cylindrical lens 36 to a line relating to the slit positions 14a and 24a on the final recording plate 37.

In operation, two photographs are made of the terrain/targets of interest by camera(s) pointed in the same direction at two arbitrary sets of coordinates. Through any appropriate means, two edge-enhanced darkfield transparencies 10 and 20 are made from the photographs and positioned as shown in FIG. 4. The use of transparency 10 will be followed first. A lens 12 focuses well-collimated light 11 to a point 13. The coordinate of 13 as well as the size and position of the transparency are determined by scaling factors in such a way that 13 represents the camera position and 10 relates to the projection plane $P_1$ (see FIG. 1).

As slit aperture 14a of plate 14 is lowered toward 10, corresponding to a movement of a line through the terrain/target configuration, frame 15 moves forward, maintaining contact with the slit. Thus, the photographic record on each frame corresponds to a scan of the light ray configuration from the terrain/targets as it intersects an aperture of width Y, position X and resolution width $\Delta X$ on a plane (perpendicular to the camera) which moves through the terrain/target configuration. When one frame is finished, the slit and frame move back upward, the slit advances to a new position $x + \Delta x$ (corresponding to $X + \Delta X$), and the slit moves downward again as the next frame is exposed while moving forward.

The exposed frames are developed at 16 to give a positive transparency of each frame, and, hence, are also edge-enchanced darkfield representations. An identical process occurs from the second set of recording frames which utilize an edge-enhanced darkfield transparency 20 made by a camera at the second set of coordinates.

Each developed frame corresponding to the first camera coordinates is superimposed on that relating to the same slit position for the other camera coordinates. Collimated light from 33 passes through frames 34 and 35. The light passing through both frames is then focused by cylindrical lens 36 to a line on final recording plate 37. With each frame pair, 37 advances perpendicular to the line (by an amount corresponding to the resolution element $\Delta x$) for new exposure. The image on the final recording plane is an edge-enhanced, orthographic projection of the terrain/target configuration onto a plane normal to the lines along which the cameras are pointed.

As can be appreciated, the system described in this invention requires only two photographic inputs, is largely automatic, requires no transmitting and range scanning for the input, and the optical resoltuion (rather than microwave resolution, etc.) is, of course, superior.

I claim:

1. A system for producing an edge-enhanced, darkfield, orthographic projection image of complexed terrain/target configuration comprising making two different photographs of the complex terrain/target, utilizing the photographs to produce edge-enhanced, darkfield transparencies, utilizing said transparencies to expose recording frames, developing said recording frames to produce positive transparencies, superimposing said positive transparencies one over the other, passing collimated light from a light source through transparent portions of the positive transparencies to a focusing lens that focuses the light transmitted through said positive transparencies to one line on a recording plate which, when containing an ensemble of such lines, produces an edge-enhanced, orthographic projection of the terrain/target configuration on the recording plate.

2. A system for producing an edge-enhanced, darkfield, orthographic projection image as set forth in claim 1, wherein each of said recording frames are exposed to a transparency by utilizing a lens to focus a beam of well-collimated light to a point with said transparency being positioned between said lens and said frame and a slit aperture plate placed in contact with said frame and also between said frame and said transparency with the frame being moved horizontally with respect to vertically moving said slit aperture plate as said frame is exposed to the collimated light projecting through the transparency.

3. A system for producing an edge-enhanced, darkfield, orthographic projection image as set forth in claim 2, wherein said two photographs are made by cameras pointed in the same direction at two arbitrary sets of coordinates.

4. A system for producing an edge-enhanced, darkfield, orthographic projection image as set forth in claim 3, wherein said slit aperture plate is lowered toward said transparency in a position corresponding to movement of a line through the terrain/target configuration.

* * * * *